US012673468B2

(12) United States Patent
Perrin et al.

(10) Patent No.: US 12,673,468 B2
(45) Date of Patent: Jul. 7, 2026

(54) METHOD AND DEVICE FOR INFRARED WELDING OF POLYMER COMPOSITES

(71) Applicant: LUXEMBOURG INSTITUTE OF SCIENCE AND TECHNOLOGY (LIST), Esch-sur-Alzette (LU)

(72) Inventors: Henri Perrin, Esch-sur-Alzette (LU); Régis Vaudemont, Esch-sur-Alzette (LU); Doriane Del Frari, Esch-sur-Alzette (LU)

(73) Assignee: LUXEMBOURG INSTITUTE OF SCIENCE AND TECHNOLOGY (LIST), Esch-sur-Alzette (LU)

( * ) Notice: Subject to any disclaimer, the term of this patent is extended or adjusted under 35 U.S.C. 154(b) by 92 days.

(21) Appl. No.: 18/861,299

(22) PCT Filed: Apr. 28, 2023

(86) PCT No.: PCT/EP2023/061323
§ 371 (c)(1),
(2) Date: Oct. 29, 2024

(87) PCT Pub. No.: WO2023/209193
PCT Pub. Date: Nov. 2, 2023

(65) Prior Publication Data
US 2025/0282102 A1      Sep. 11, 2025

(30) Foreign Application Priority Data
Apr. 29, 2022   (LU) ........................................ 501975

(51) Int. Cl.
*B29C 65/14*      (2006.01)
*B29C 65/00*      (2006.01)
(Continued)

(52) U.S. Cl.
CPC ...... *B29C 65/1412* (2013.01); *B29C 65/1432* (2013.01); *B29C 65/1467* (2013.01); *B29C 65/1496* (2013.01); *B29C 65/18* (2013.01); *B29C 65/7841* (2013.01); *B29C 66/43* (2013.01); *B29C 66/8161* (2013.01);
(Continued)

(58) Field of Classification Search
CPC . B29C 65/1467; B29C 65/1496; B29C 65/18; B29C 66/8322; B29C 73/30; B29C 66/1122; B29C 66/43; B29C 66/8161; B32B 37/06; B32B 37/10
See application file for complete search history.

(56) References Cited

U.S. PATENT DOCUMENTS 5,151,149 A     9/1992 Swartz
5,718,791 A  *  2/1998 Spengler ............... B29C 63/025
                                                          156/212

FOREIGN PATENT DOCUMENTS

JP            1190986 A      4/1999

OTHER PUBLICATIONS

International Search Report and Written Opinion for PCT/EP2023/061323, dated Jul. 5, 2023, 13 pages.

* cited by examiner

*Primary Examiner* — Scott W Dodds
(74) *Attorney, Agent, or Firm* — RANKIN, HILL & CLARK LLP

(57) ABSTRACT

A system and a method for infrared welding of carbon-fibre reinforced thermoplastic that enables to obtain pieces of better quality and strength. The system holds the two workpieces to be bonded in a cantilever manner. A pre-heating step for homogenisation can be foreseen.

12 Claims, 4 Drawing Sheets

(51)  Int. Cl.
       *B29C 65/18*        (2006.01)
       *B29C 65/78*        (2006.01)
       *B29C 73/30*        (2006.01)
       *B29C 73/34*        (2006.01)
       *B32B 37/06*        (2006.01)
       *B32B 37/10*        (2006.01)
       *B29K 307/04*       (2006.01)
(52)  U.S. Cl.
       CPC .... *B29C 66/8322* (2013.01); *B29C 66/83221*
           (2013.01); *B29C 73/30* (2013.01); *B29C 73/34*
           (2013.01); *B32B 37/06* (2013.01); *B32B 37/10*
               (2013.01); *B29C 66/1122* (2013.01); *B29K*
                                    *2307/04* (2013.01)

[Fig 1]
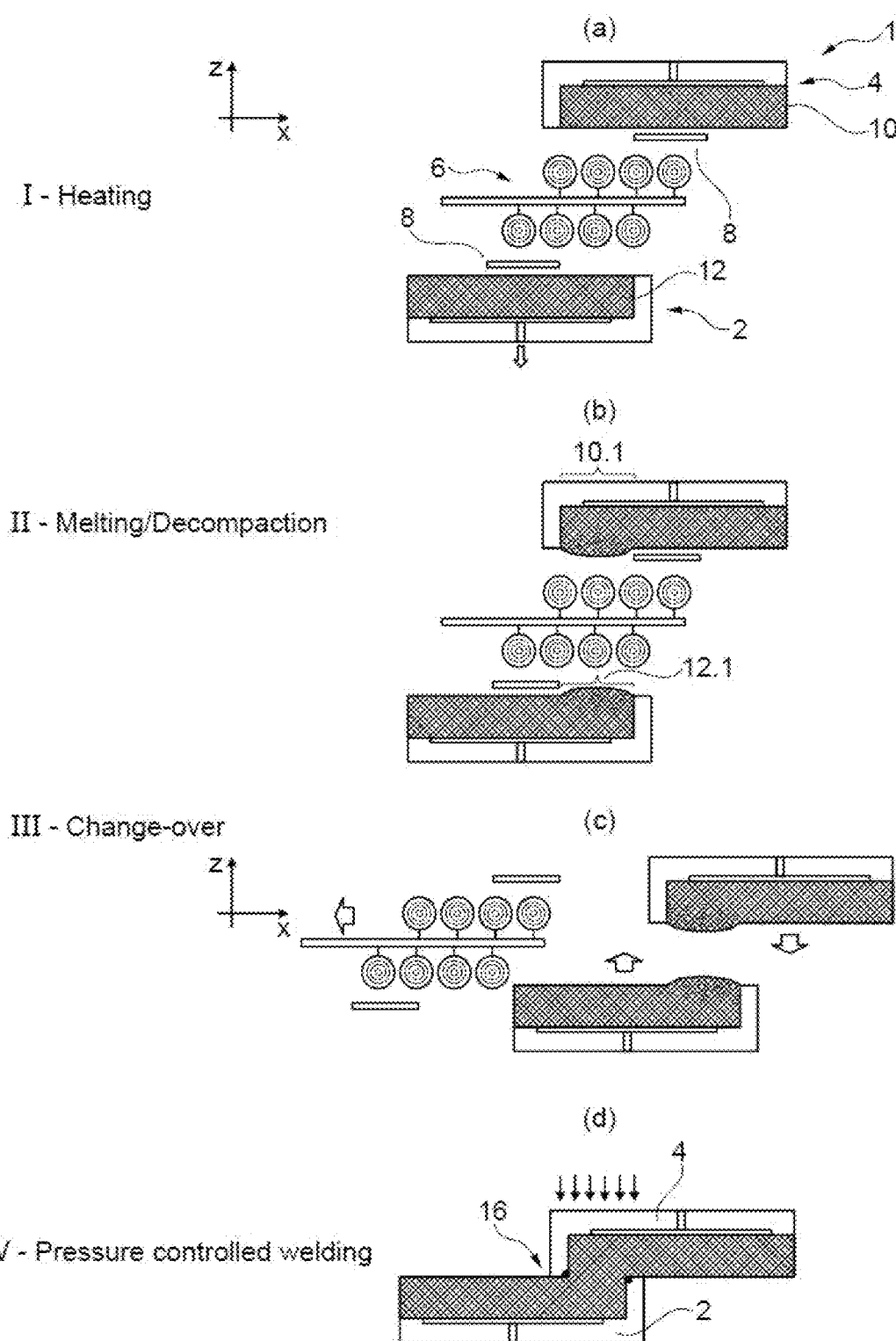
I - Heating
II - Melting/Decompaction
III - Change-over
IV - Pressure controlled welding

[Fig 2]
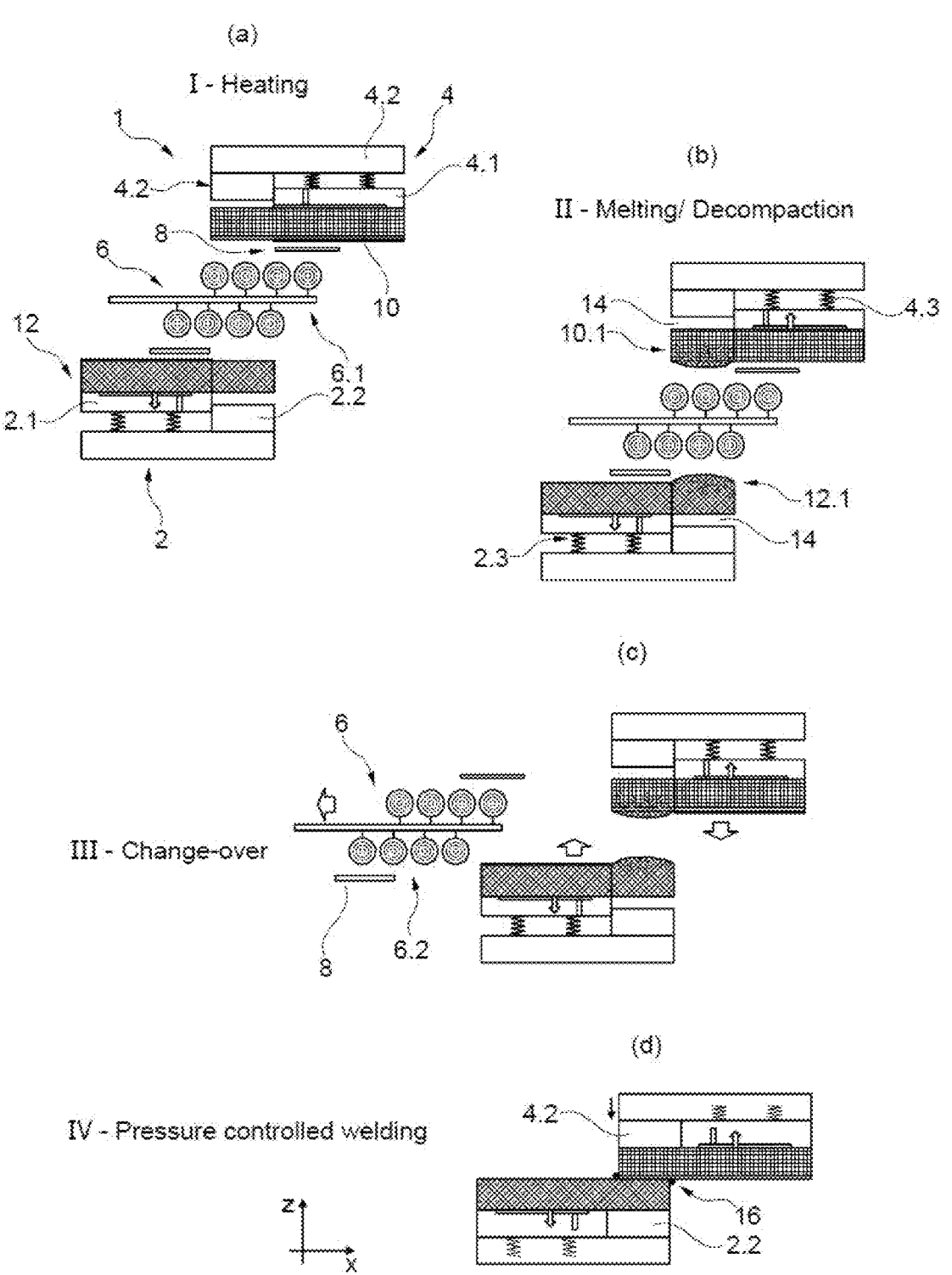

[Fig 3]
(a1)
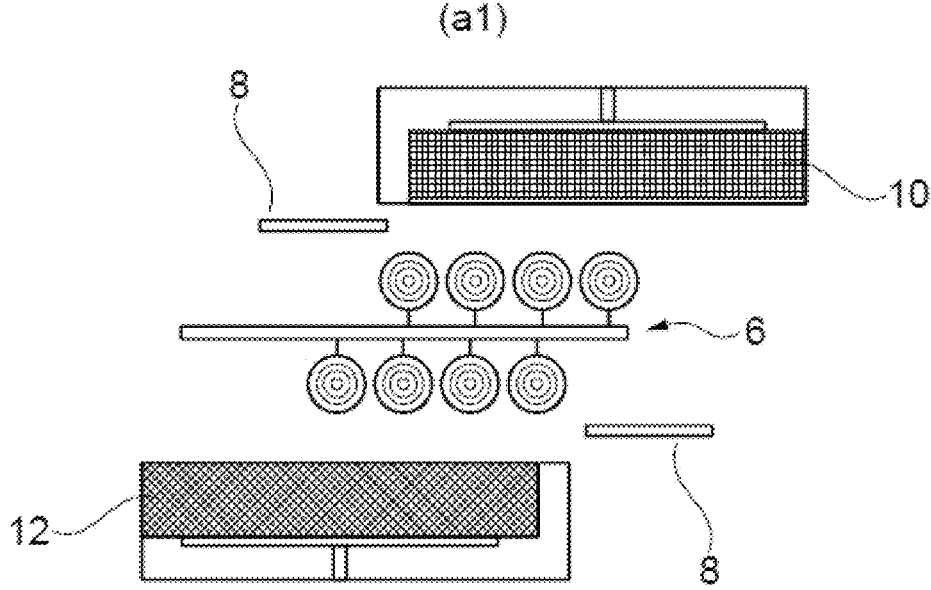
[Fig 4]
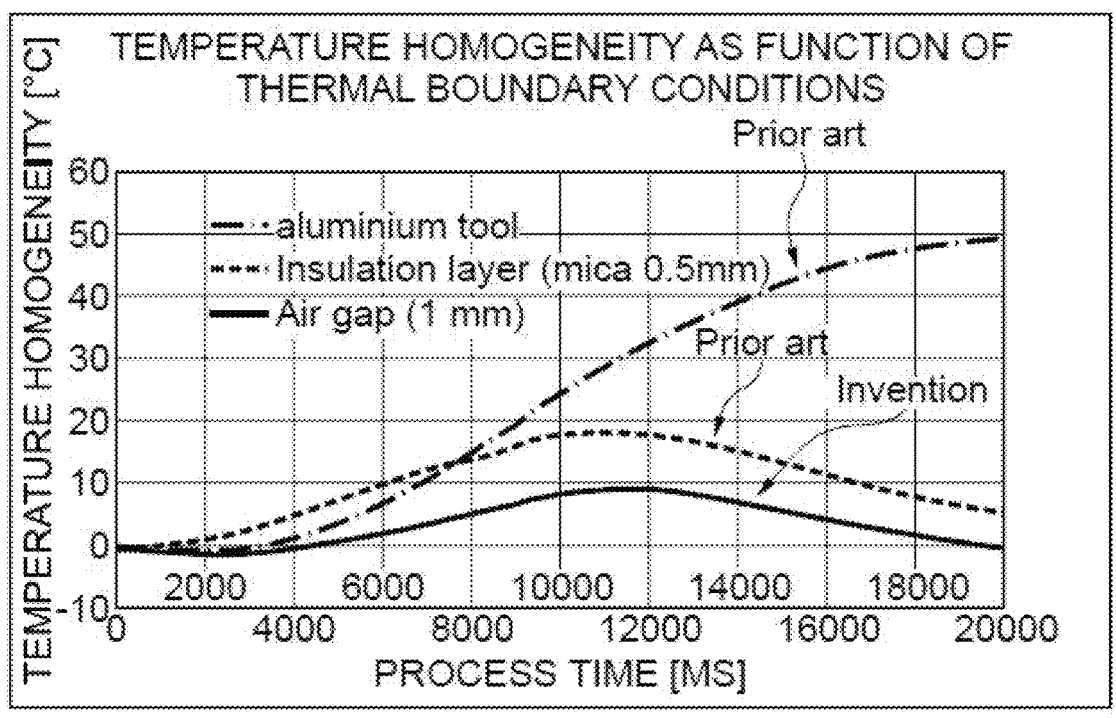

[Fig 5]
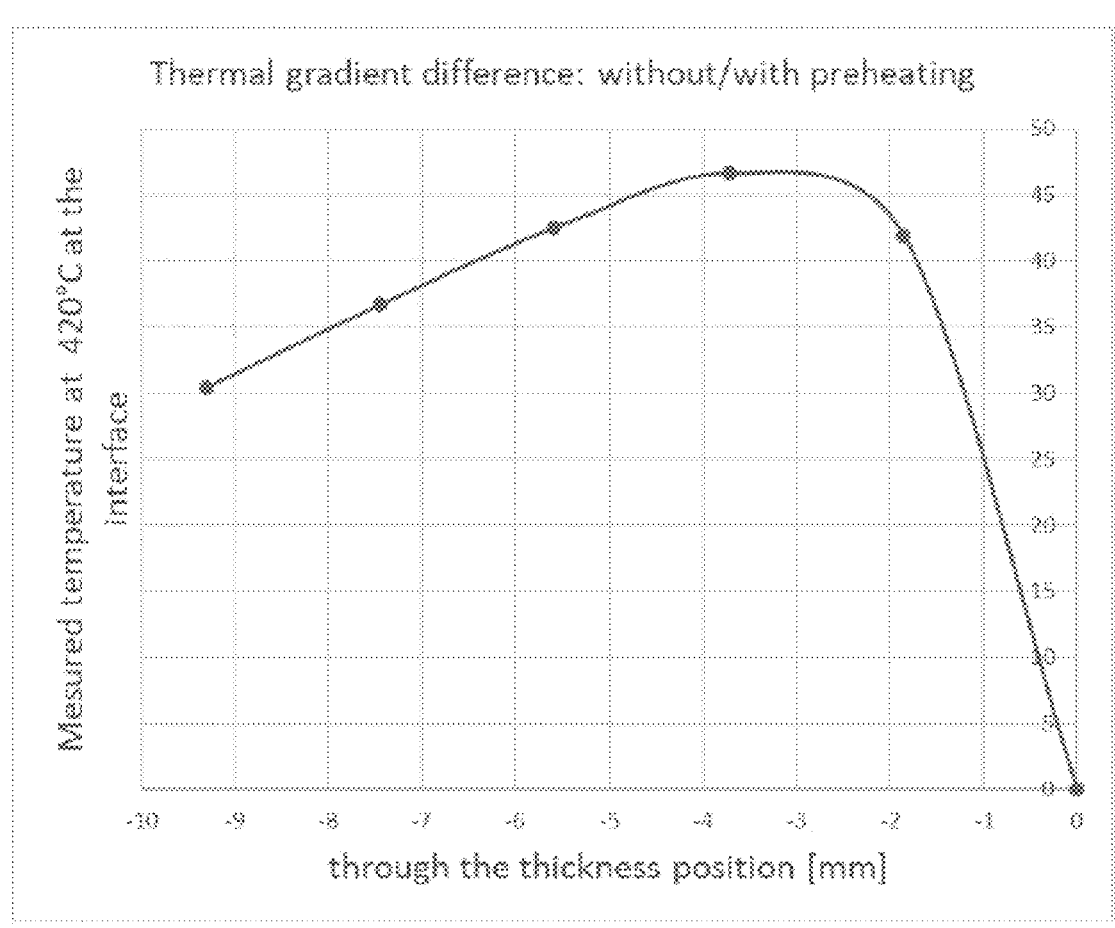

METHOD AND DEVICE FOR INFRARED WELDING OF POLYMER COMPOSITES

TECHNICAL FIELD

The invention relates to the manufacturing process of welding of polymers. More specifically, the invention provides a solution for welding polymers by infrared welding.

BACKGROUND ART

Infrared welding is a technique that is adequately used for binding plastic materials together. It consists in placing two workpieces in holders (as in forging dies) and, after radiating with infrared light appropriate portions of the workpieces, to apply a force between the two workpieces to bond them together.

FIG. 1 illustrates such a technique. The system 1 comprises a lower tool 2 and an upper tool 4, movable vertically (direction z). A series of infrared lamps 6 is movable transversally (along x), together with screens 8 preventing the radiations from the lamps 6 to reach the entirety of the workpieces 10 and 12 to be bonded together.

FIG. 1 shows the four main steps of infrared welding: in step (a), the lamps are switched ON and start to radiate; in step (b) a portion 10.1, 12.1 of the workpieces 10, 12 starts to melt or decompact (and thus increases in width); in step (c) the heating lamps and screens are retracted and in step (d) the tools 2, 4 are brought towards each other to apply a welding pressure.

This known technique however does not suit welding operations of materials with high heat conductivity. For instance, carbon-fibre reinforced thermoplastics (CFRTP) have a heat conductivity (0.7-1.5 $W \cdot m^{-1} \cdot K^{-1}$) that is 5 to 10 times higher than the heat conductivity of some other polymers. This implies that the variation of temperature through-out the workpiece can significantly impact the structure (porosity, crystallisation rate) of the end product.

This issue becomes particularly worrying for pieces having a thickness that is greater than a few millimetres. The lack of a homogenous thermal gradient during welding can induce an amorphous state at the interface. A structural heterogeneity can be observed along the weld bead. In the example of FIG. 1, heat is conducted from the heated workpieces to the tools 2, 4, and it may happen that the workpiece is not brought up to the desired welding temperature due to dispersion of heat into the tools. Also, the workpieces do not heat homogeneously and they cool down quickly in a non-homogenous manner (hence a risk of obtaining amorphous and thus non-bindable structure).

When one desires to ensure that the portions of the workpieces that are to be heated are duly heated at an appropriate welding temperature, or do not cool down too quickly, one may be tempted to overheat the workpieces. However, overheating is not admissible for CFRTP materials because these materials degrade and potentially become thermoset, thereby preventing them from being weldable thereafter.

There is therefore a need to provide a welding system and method for welding CFRTP by infrared radiations.

SUMMARY OF THE INVENTION

The invention aims at providing a system and a method which overcomes the drawbacks discussed above, and ultimately enable to properly bond by infrared radiations two workpieces of CFRTP, with a bond of high quality.

The invention relates to a system for infrared welding a first workpiece made of carbon-fibre reinforced thermoplastic polymers, CFRTP, to a second workpiece made of CFRTP, the first and second workpieces being substantially flat at least in their respective area destinated to form a weld joint between them, the system comprising: an upper tool, for holding the first workpiece; a lower tool, for holding the second workpiece, wherein the upper tool and/or the lower tool is/are movable in a vertical direction to alter a distance between them; and movable infrared heating means, configured to move in a transverse direction between an operative position where the heating means can simultaneously heat a respective portion of the first workpiece and of the second workpiece, and a resting position; wherein the upper and the lower tools each comprise: a holder that holds the first workpiece or the second workpiece in a cantilevered manner, their respective portions to be heated forming the free end of the cantilever attachment; and a pusher that is movable vertically with respect to the holder between a resting position and an operative position, wherein in the resting position, the pusher is away from the first workpiece or second workpiece, so as to enable the respective to-be-heated portions of the workpieces to be surrounded by air during heating, and wherein in the operative position, the pusher contacts the heated portion of the first or second workpiece and applies a welding pressure in a vertical direction.

In essence, by enabling to isolate the heated portions of the workpieces with an air gap, the system of the invention makes it possible to obtain a smaller gradient along the thickness of the workpieces, thereby enabling infrared welding of CFRTP workpieces.

According to an advantageous embodiment, the system further comprises an upper screen and a lower screen configured to move in a transverse direction independently from the heating means, the upper and lower screens being configured to move between an operative position and a resting position, wherein in the operative position, the screens partially shield the first or the second workpiece from radiations emitted by the heating means.

In comparison with the prior art systems where the screens are kinematically fixed to the infrared lamps, this embodiment of the invention enables to pre-heat a wider portion of the workpieces than the sole portion that is to be welded. This makes it possible to obtain a smaller in-plane thermal gradient and to better control the interfacial crystallization. The crystallisation state at the welding interface is more homogeneous.

According to an advantageous embodiment, the upper and the lower screens are configured to move in opposite directions. This offers more flexibility for the path that the lamps have to take to reach their operative position, thereby reducing the time gap between heating and connecting the workpieces together. As discussed above, the high heat conductivity of the materials also means that each second that passes between heating and pressing can impact the quality of the end product.

According to an advantageous embodiment, the system further comprises springs interposed between the pusher and the holder of each tool, to maintain the pushers in their resting position, and the system comprises actuators to compensate the force of the springs to move the pushers in their operative positions.

According to an advantageous embodiment, the system further comprises heating means for heating the holders and/or the pushers. This also reduces the dissipation of heat from the workpiece by conduction and improves the temperature homogeneity during and after heating of the workpieces.

The invention also relates to a method for infrared welding a first workpiece made of carbon-fibre reinforced thermoplastic polymers, CFRTP, to a second workpiece made of CFRTP, the first and second workpieces being substantially flat at least in their respective area destinated to form a weld joint between them, the method being carried out with a system according to any of the embodiments discussed above, the method comprising: heating a respective portion of the first and second workpieces with the infrared heating means, while the first and second workpieces are held in a cantilevered manner in the holders, and while the pushers are maintained away from the first and second workpieces, so that the heated portions are surrounded by air; moving the heating means away from the heated portions of the first and second workpieces; moving the holders closer to one another; and applying a pressure with the pushers on the first and second workpieces so that the respective heated portions bond together and form the weld joint.

According to an advantageous embodiment, the system further comprises an upper and a lower screen configured to move in a transverse direction independently from the heating means, the upper and lower screen being configured to move between an operative position and a resting position, wherein in the operative position, the screens partially shield the first or the second workpiece from radiations emitted by the heating means, the method further comprising, prior to the step of heating, a step of pre-heating, during which the heating means are in their operating position and the screens are in their resting position.

According to an advantageous embodiment, during preheating the first and second workpieces are brought to a homogeneous temperature of about 100° C.

According to an advantageous embodiment, during preheating, the heating means are sequentially delivering energy, e.g., by flashing infrared lights.

According to an advantageous embodiment, after preheating and before heating, the heating means are switched off but are maintained in their operative position for a duration of time enabling homogenisation of the temperature through-out the first and second workpiece.

According to an advantageous embodiment, before the step of heating, the screens are brought in their operative position.

BENEFITS OF THE INVENTION

The several aspects of the invention ensure to various degrees to enable to obtain with infrared welding a carbon-fibre reinforced product of high quality (aeronautics quality standard). The system and method of the invention also allow to obtain robust products of various thicknesses (even above 12 mm thick).

The system and method of the invention have shown the absence of a welding burr and hence no need for a step of cleaning. The controlled crystallisation means that there is no need for a crystallisation curing after welding. Thus, the system and method of the invention result in the process of welding being faster.

With the system and method of the invention, the crystallisation occurs from the melt state rather than requiring cold crystallization by post curing.

A crystallisation rate greater than 18% was observed over the whole thickness whereas prior art techniques enable no crystallisation or at best about 2%.

The system and method of the invention are compatible with PAEK polymers and suitable for weave or UD tape.

The system and method of the invention are adaptable on existing welding machines.

Further benefits may be apparent in relation to the discussion of the figures below.

BRIEF DESCRIPTION OF THE FIGURES

FIG. 1 shows a method according to prior art;

FIG. 2 shows the same succession of steps made with the system of the invention;

FIG. 3 shows a variant with an additional step of pre-heating;

FIG. 4 shows a comparative result of the gradient of temperature in the thickness of the workpieces;

FIG. 5 shows a graph highlighting the effect of pre-heating.

DETAILED DESCRIPTION OF PREFERRED EMBODIMENTS

The following examples and drawings are given for illustration purposes only. The invention is not limited by these examples but only by the appended claims. The various parts of the system can have various properties or be embodied in various ways. Each variant of each part of the system may be combined with each variant of any other parts of the system, unless explicitly mentioned otherwise.

The drawings are schematic and not drawn to scale. Some elements of the system are not illustrated, such as for example: elements for assembling the various parts together (flanges, screws, etc.), elements for properly ensuring sealing of various compartments (seals, etc.), or elements for controlling the system (wires, sensors, actuators, valves, safety devices, etc.).

FIG. 1 is discussed above in relation to the background art.

FIG. 2 shows a system of the invention and the various steps (a) to (d) of the method for infrared welding.

In a step (a) of heating, infrared lights 6 are positioned in an operative position 6.1 between two tools 2, 4 holding the workpieces 10, 12.

The workpieces 10, 12 are held in a respective holder 2.1, 4.1 of the tools 2, 4 such that they are held in a cantilevered manner. This results in the workpieces 10, 12 exhibiting a free end 10.1, 12.1 that corresponds to a portion of the workpieces that is intended to be heated for bonding the workpieces 10, 12 together. For instance, the size of the portions 10.1, 12.1 can be a tenth or a thousandth of the size of the workpieces 10, 12. The workpieces 10, 12 are substantially flat at least in the vicinity (a few cm) of the portions 10.1, 12.1. The thickness of the workpieces 10, 12 can be of 1 to 20 mm.

To focus the heat on the portions 10.1, 12.1, screens 8 are provided to prevent the radiations from the heating means 6 to reach other areas of the workpieces 10, 12.

In step (b), the heating process continues and the free end portions 10.1, 12.1 of the workpieces 10, 12 begin to melt and to decompact.

During heating, the end portions 10.1, 12.1 are surrounded by air 14. This is made possible by the design of the tools 2, 4, which do not contact vertically the end portions 10.1, 12.1: the tools 2, 4 are made of two kinematically distinct parts, held away from each other by springs 2.3, 4.3. The pushers 2.2, 4.2 are thus remote from the workpieces 10, 12 during heating.

In step (c), the heating means 6 are moved away to their resting position 6.2, to allow one or both of the tools 2, 4 to move vertically to ensure the contact between the two workpieces 10, 12, more specifically, the contact between their melted portions 10.1, 12.1.

An adequate pressure may be applied (beyond the force that is needed to compensate the force of the springs 2.3, 4.3) for an appropriate duration for ensuring the weld joint 16 to form.

FIG. 3 shows that in complement to the steps of FIG. 2, an additional step of pre-heating (a1) can be foreseen, i.e., before the step (a) of FIG. 2.

In comparison with the step (a) of heating, in the step (a1) of pre-heating, the screens 8 are positioned in their resting position. This enables the heating means 6 to radiate over a wider portion of the workpieces 10, 12.

During pre-heating the heating means are producing a lower amount of power (or the same amount for shorter amount of time, for instance sequentially). This ensures that the workpieces 10, 12 are slowly brought to a homogeneous temperature below the melting temperature.

Optionally, after pre-heating, a step of homogenization can be performed, where the heating means are switched off for a given duration of time to enable the homogenization of heat through-out the workpieces (by internal conduction).

After pre-heating (a1) and before heating (a), the screens 8 are brought in their operative position (see (a) on FIG. 2). They advantageously move in opposite directions.

In a variant that is not illustrated, the holders 2.1, 4.1 and/or the pushers 2.2, 4.2 are heated by appropriate heating means (e.g., resistors) to reduce further the gradient of temperature within the workpieces.

FIG. 4 is a graph showing the gradient of temperatures in the thickness of the workpiece 10 as a function of time.

The top curve shows that within 20 seconds, the gradient of temperature of the system shown on FIG. 1 reaches 50° C. Another comparative example is shown where an insulation layer of mica was spread between the workpiece 10 and the tool 4. The gradient of temperature reaches about 20° C. within 10 seconds but then shows some homogenization.

The lowest curve shows the gradient measured with the system of the invention. The maximum measured gradient is of about 10° C., hence two to five times better than prior art systems.

This low gradient of temperature that is obtained with the system and process of the invention enables to accelerate the overall process without damaging the material: a heating ramp rate of more than 20° C.·s⁻¹ could be successfully used instead of the 7° C.·s⁻¹ with the system of prior art. This led to a reduction from 50 seconds to 20 seconds for the duration of the heating step. The maximum temperature at the external surface was well controlled at 400° C. instead of 450° C. with prior art techniques (which require to heat for a longer duration).

FIG. 5 highlights the effect of pre-heating on the gradient of temperature through the thickness of the workpieces. The curve is the difference of gradients between the gradient obtained without pre-heating and the gradient obtained with pre-heating. This curve shows that the gradient of temperature is reduced by about 30 to 45° C. over most of the thickness of the workpieces. The point of the curve with coordinates (0;0) is understandable, since the temperature at the interface between the two workpieces results from heating and is a boundary condition that is common to both methods, with or without pre-heating.

An exemplary thin composite material was used with the process of FIG. 2 to demonstrate its aptitude to provide better results than known technique: Toray Cetex 1225, 6 plies, 1.86 mm thick, presenting a quasi-isotropic lay-up: [0°/45°/90°]. The carbon weave is a 5 Harness Satin made of a T300JB carbon filament. For a step of heating of a duration of about 22 seconds and a welding pressure of about 3 bar, the porosities content measured was less than 0.5% over the entire welded area. The tools were heated at 200° C.

In another example, a thick composite material was used with the process of FIG. 2 and with the complementary pre-heating step of FIG. 3: Toray Cetex 1225, 36 plies, 11.16 mm thick presenting a quasi-isotropic lay-up: [0°/45°/90°]. The carbon weave is a 5 Harness Satin made of a T300JB carbon filament. Pre-heating was done at 50% of power during 25 seconds, followed by 10 seconds at 15% for homogenisation. The heating step was done at 80% of power during 14 seconds. A welding pressure of 3 bar. The porosities content measured was less than 0.5% over the entire welded area. The tools 2, 4 were kept at room temperature.

Known techniques result in a porosity greater than 5% which means that the end product is weaker and that the dimensions of the end-product are more chaotic in the area of the weld joint.

Single lap shear test showed that the standard deviation of a welding joint was less than 0.7 MPa when performed with the system or method of the invention (to be compared with more than 4 MPa with the known technique).

The application targets specifically welding joints of two flat surfaces, for instance for a rib of an aircraft wing, but the invention is not limited to this particular example and can be adapted to various types or various geometries of weld bead.

Also, the skilled person would understand from the teaching of this application that the invention can be carried out with alternative heating means (not infrared), and for other materials than carbon-reinforced thermoplastics.

The invention claimed is:

1. A system for infrared welding a first workpiece made of carbon-fiber reinforced thermoplastic polymers (CFRTP) to a second workpiece made of CFRTP, the first and second workpieces each having a respective portion that is substantially flat, the respective portions of the first and second workpieces forming a weld joint between them, the system comprising:

an upper tool, for holding the first workpiece;

a lower tool, for holding the second workpiece, wherein the upper tool and/or the lower tool is/are configured to move in a vertical direction to alter a distance between them in order to apply a welding pressure to form the weld joint; and a movable infrared heating means, configured to move in a transverse direction between an operative position between the upper tool and the lower tool for simultaneously heating the respective portions of the first workpiece and the second workpiece, and a resting position away from the first workpiece and the second workpiece;

wherein the upper and the lower tools each comprise:

a holder configured to hold either the first workpiece or the second workpiece during the heating such that the respective portion for forming the weld joint extends off the holder in a cantilevered manner; and a pusher configured to move vertically with respect to the holder between a pusher resting position during the heating and a pusher operative position during the welding pressure, wherein in the pusher resting position, the pusher is spaced from the respective portion of the first workpiece or second workpiece that extends off the holder, so as to enable the respective portions of the first and second workpieces to be surrounded by air during the heating, and wherein in the pusher operative position, each pusher contacts the respective portions of the first and second workpiece that extend off the holder to apply the welding pressure and form the weld joint.

2. The system according to claim 1, wherein the system further comprises an upper screen and a lower screen configured to move in the transverse direction independently from the movable infrared heating means, the upper and lower screens being configured to move between a screen operative position and a screen resting position, wherein in the screen operative position, the upper and lower screens partially shield the first and the second workpiece from radiations emitted by the movable infrared heating means.

3. The system according to claim 2, wherein the upper and the lower screens are configured to move in opposite directions.

4. The system according to claim 1, further comprising springs on the holder of each of the upper tool and lower tool to maintain the pusher resting position, and the system comprises actuators to compress the springs to move each pusher into the pusher operative position.

5. The system according to claim 1, further comprising a heating means for heating each holder and/or each pusher.

6. A method for infrared welding a first workpiece made of carbon-fiber reinforced thermoplastic polymers (CFRTP) to a second workpiece made of CFRTP, the first and second workpieces each having a respective portion that is substantially flat, the respective portions of the first and second workpieces forming a weld joint between them, the method being carried out with a system comprising:

an upper tool, for holding the first workpiece;
a lower tool, for holding the second workpiece, wherein the upper tool and/or the lower tool is/are configured to move in a vertical direction to alter a distance between them in order to apply a welding pressure to form the weld joint; and
a movable infrared heating means, configured to move in a transverse direction between an operative position between the upper tool and the lower tool for simultaneously a heating the respective portions of the first workpiece and the second workpiece, and a resting position away from the first workpiece and the second workpiece;
wherein the upper and the lower tools each comprise:
a holder configured to hold either the first workpiece or the second workpiece during the heating such that the respective portion for forming the weld joint extends off the holder in a cantilevered manner; and
a pusher configured to move vertically with respect to the holder between a pusher resting position during the heating and a pusher operative position during the welding pressure, wherein in the pusher resting position, the pusher is spaced from the respective portion of the first workpiece or second workpiece that extends off the holder, so as to enable the respective portions of the first and second workpieces to be surrounded by air during the heating, and wherein in the pusher operative position, each pusher contacts the respective portions of the first and second workpiece that extend off the holder to apply the welding pressure and form the weld joint, the method comprising:

heating the respective portions of the first and second workpieces with the movable infrared heating means, while the first and second workpieces are held in the cantilevered manner, and while each pusher is spaced from the first and second workpieces, so that the respective portions are surrounded by air;
moving the movable infrared heating means away from the heated respective portions of the first and second workpieces to the resting position;
moving each holder closer to one another; and
applying the welding pressure with each pusher to bond the heated respective portions and form the weld joint.

7. The method according to claim 6, wherein the system further comprises an upper and a lower screen configured to move in the transverse direction independently from the movable infrared heating means, the upper and lower screen being configured to move between a screen operative position and a screen resting position, wherein in the screen operative position, the upper and lower screens partially shield the first and the second workpiece from radiations emitted by the movable infrared heating means, and the method further comprising, prior to the step of heating, a step of pre-heating, during which the movable infrared heating means is in the operating position and the upper and lower screens are in the screen resting position.

8. The method according to claim 7, wherein during the pre-heating the first and second workpieces are brought to a homogeneous temperature of about 100° C.

9. The method according to claim 7, wherein during pre-heating, the movable infrared heating means delivers energy by flashing infrared lights.

10. The method according to claim 7, wherein after pre-heating and before heating, the movable infrared heating means are switched off in the operative position until the temperature through-out the first and second workpiece homogenizes.

11. The method according to claim 7, wherein before the step of heating, each of the upper screen and lower screen are brought to the screen operative position.

12. The method according to claim 7, wherein each holder and/or each pusher is heated during at least one of the steps of: pre-heating, heating, moving the movable infrared heating means to the resting position, moving each holder closer to one another, or applying the welding pressure.

* * * * *